D. R. SCHNAARS.
AUTOMOBILE-LOCK.
APPLICATION FILED MAY 16, 1922.
1,434,156.
Patented Oct. 31, 1922.
2 SHEETS—SHEET 1.
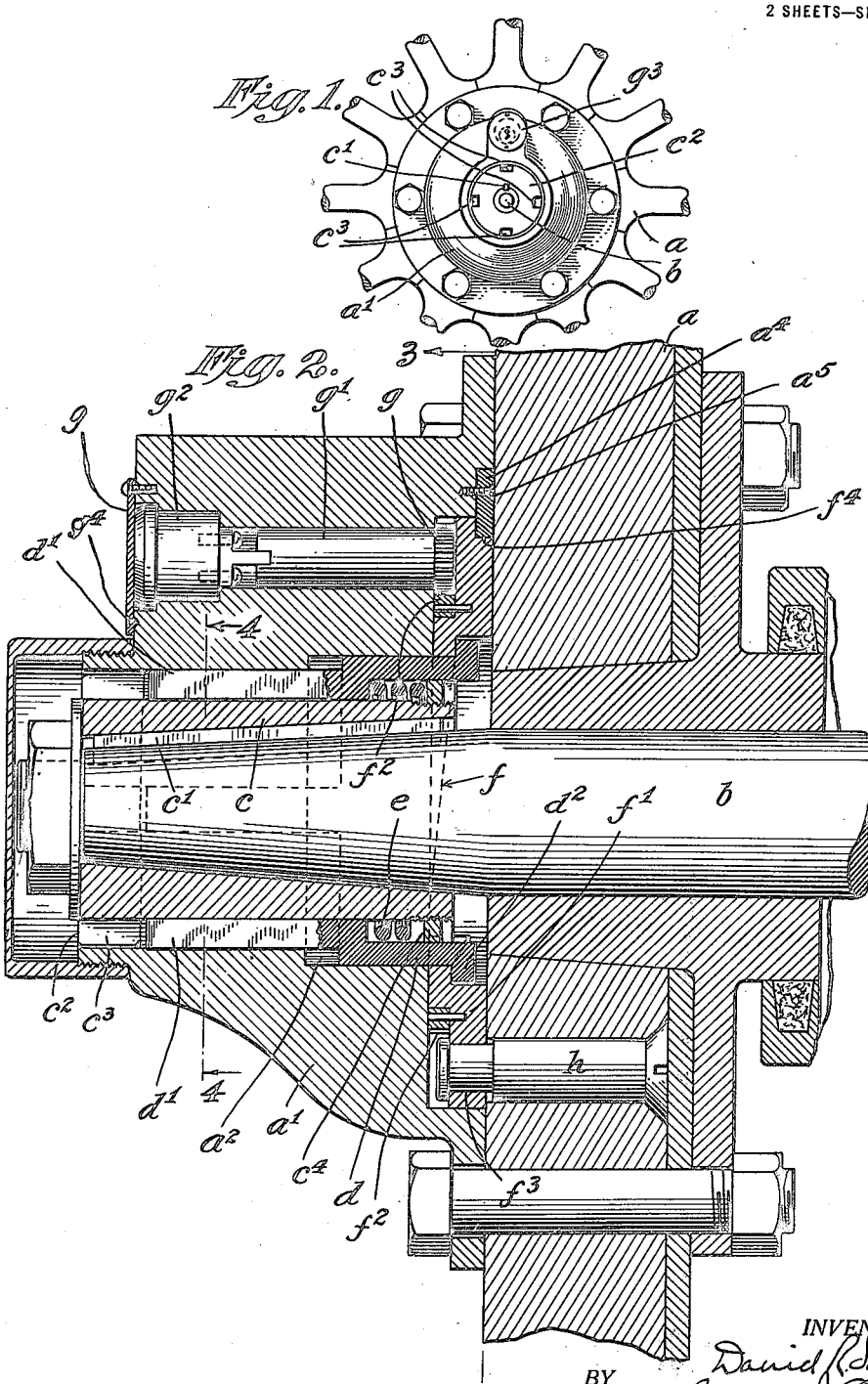
INVENTOR
David R. Schnaars
BY Redding & Greeley
ATTORNEYS

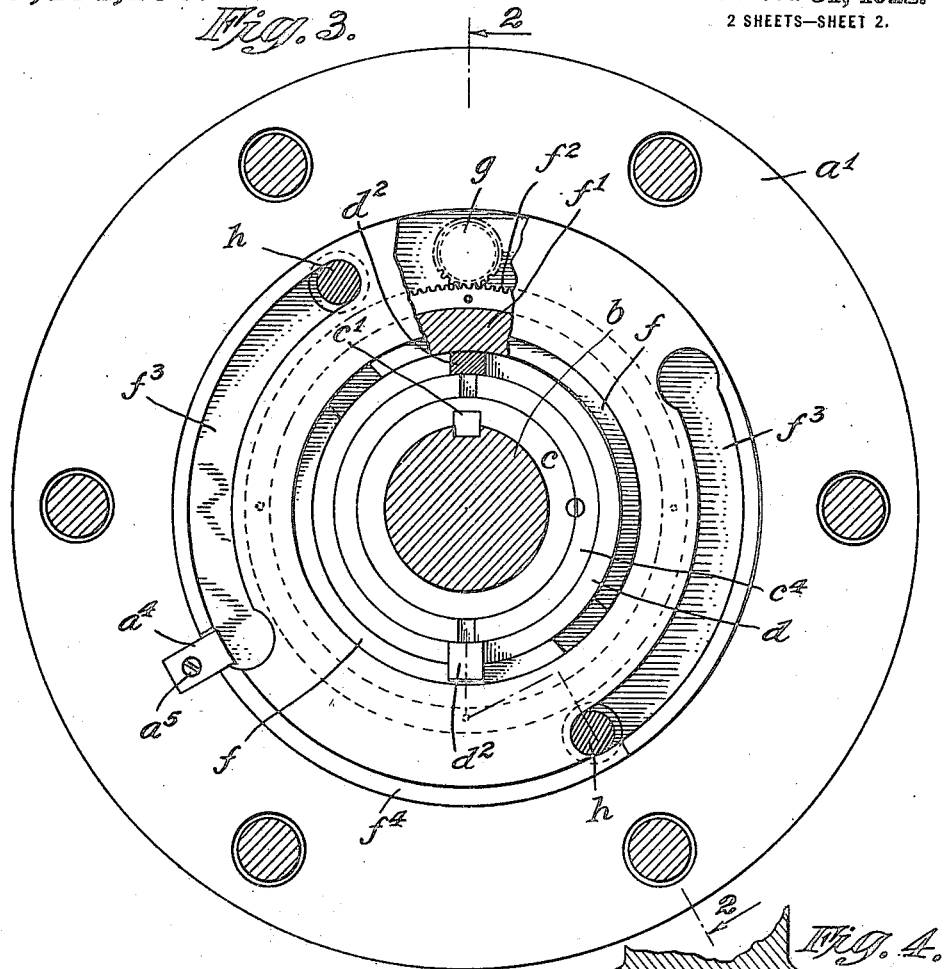
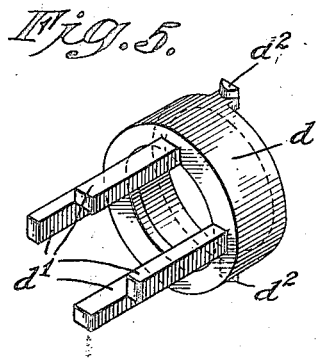
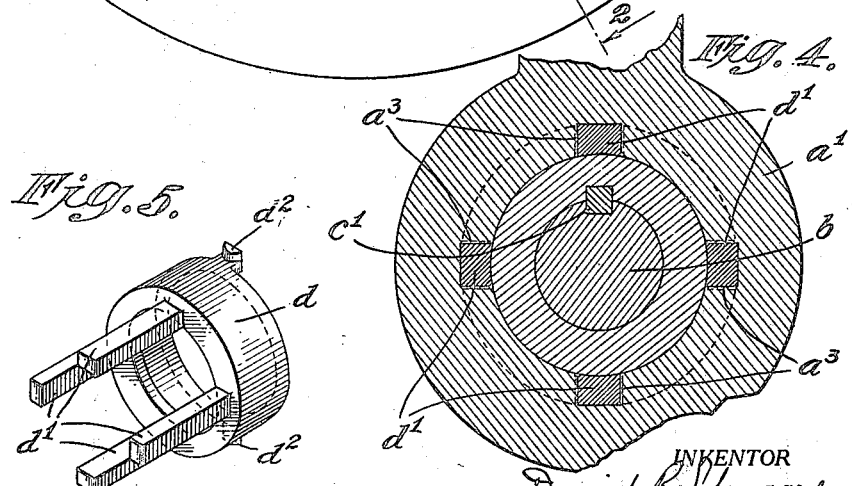

Patented Oct. 31, 1922.

1,434,156

UNITED STATES PATENT OFFICE.

DAVID R. SCHNAARS, OF BROOKLYN, NEW YORK, ASSIGNOR TO HOOLE MACHINE & ENGRAVING WORKS, OF BROOKLYN, NEW YORK, A CORPORATION OF NEW YORK.

AUTOMOBILE LOCK.

Application filed May 16, 1922. Serial No. 561,467.

*To all whom it may concern:*

Be it known that I, DAVID R. SCHNAARS, a citizen of the United States, residing at 19 Hull Street, in the borough of Brooklyn, of the city of New York, in the State of New York, have invented certain new and useful Improvements in Automobile Locks, of which the following is a specification, reference being had to the accompanying drawings, forming a part hereof.

The object of this invention is to provide a practical device whereby the driving wheel of an automobile can be locked to or unlocked from the driving axle, so that, when the wheel is unlocked from the axle, power cannot be transmitted from the motor to the wheel. Many devices have been proposed heretofore for the purpose of preventing the rotation of an automobile wheel, in order to render the theft of the automobile difficult, but in many municipalities the use of such devices is forbidden by police regulations because of the difficulty, as in the case of fire, of moving an automobile which has one or more of its wheels locked against rotation. No device is wholly effective against the theft of an automobile by towing it away, but such action attracts attention and arouses suspicion and is therefore rarely attempted. The majority of thefts of automobiles have been accomplished by driving them away under their own power, but with a practical device, such as that wherein the present invention consists, whereby a driving wheel of an automobile can be disengaged, through the manipulation of a suitable key, from its driving shaft, while proper driving engagement can again be secured by the manipulation of the key, the theft of an automobile is rendered difficult. In accordance with the invention there is provided between the driving axle and the hub of the wheel mounted thereon, a clutch, the movable member of which can be moved by the manipulation of a key inserted in a lock so as to disengage the wheel from the shaft or to effect such engagement. The invention will be explained more fully hereinafter with reference to the accompanying drawings in which it is illustrated and in which—

Figure 1 is a view in elevation showing an automobile wheel hub to which the locking device is applied and with a portion of the wheel, the hub cap being removed.

Figure 2 is a longitudinal section thereof on the plane indicated by the broken line 2—2 of Figure 3, but on a larger scale than that of Figure 1.

Figure 3 is a view in section on the plane indicated by the broken line 3—3 of Figure 1, looking in the direction of the arrows.

Figure 4 is a view in section on the plane indicated by the broken line 4—4 of Figure 2.

Figure 5 is a detail view in perspective of the movable clutch member.

In the embodiment of the invention illustrated in the drawings, a driving wheel $a$, only a part of which is shown, is mounted upon a driving shaft $b$, in such manner that the driving shaft can be rotated independently of the wheel except when the two are engaged as hereinafter described. As shown the terminal portion of the shaft is tapered and receives with a driving fit a sleeve $c$ which forms practically a part of the driving shaft, being secured thereto not only by the driving fit but by a key $c'$. The sleeve is cylindrical exteriorly for convenience and has at its outer end a flange $c^2$ which is slotted as at $c^3$, thus forming, with the shaft of which it virtually forms part, the fixed member of a clutch. At its inner end it is threaded to receive a ring $c^4$ which which forms an abutment for a spring hereinafter referred to.

The hub $a'$ is chambered, as at $a^2$, to receive between itself and the sleeve $c$, a sleeve $d$ which has a free fit within the hub and on the sleeve $c$ and carries four keys $d'$ for engagement with the slots $c^3$ in the flange $c^2$ of the sleeve $c$, the keys $d'$ having a free sliding fit in key ways $a^3$ which are formed in the hub $a'$. The sleeve $d$ and the keys $d'$ are urged toward the outer end of the hub by a spring $e$ which is placed in a chamber formed within the sleeve $d$, between the sleeves $c$ and $d$ and abuts against the rim $c^4$. The sleeve $d$ is also provided with extended, overhanging lugs $d^2$ to be engaged by the cams $f$ of a cam ring $f'$ which is seated in a circular recess formed in the inner face of the hub $a'$ and is provided with a gear $f^2$ for engagement by a pinion $g$ which is formed on or secured to an extension $g'$ of the cylinder $g^2$ of a cylinder lock which is seated in the hub with its face normally covered, for protection from dirt, by a movable cover $g^3$ which may be formed with a snap detent $g^4$.

In order to prevent the possibility of removal of the hub from the wheel, when the wheel is unlocked from the axle, and the manipulation of the parts so as to effect engagement of the wheel with the axle, the cam ring $f'$ is formed with keyhole slots $f^3$, which engage headed studs $h$, except when the parts are in the locked position, at which time the studs register with the enlarged ends of the slots. To prevent the hub from being drawn off even to a limited extent, permitted by the compression of the spring $e$, a short plate $a^4$ is set into the hub $a'$ and secured by a screw $a^5$, its end overlapping the ring $f'$, which is rabbeted, as at $f^4$ to receive the end of the plate. The slots $f^3$, in co-operation with the headed studs $h$, also serve, as will be observed, to limit the rotation of the cam ring $f'$.

It will be understood that when all parts have been assembled properly and the cam ring $f'$ has been rotated so as to permit the sleeve $d$ to have its full forward movement under the influence of the spring $e$, the keys $d'$ enter the slots $c^2$ of the flange $c^3$ and so effect driving engagement between the hub and the axle, the keys and the slotted flange having sufficient strength to transmit, under all conditions of use, the rotation of the axle $b$ to the hub $a'$ and therefore to the wheel. If then at any time thereafter it should be desired to leave the automobile unattended, the proper key is inserted in the cylinder $g^2$ of the lock and the cylinder is rotated until the cam ring $f'$ has been rotated as far as possible. During this operation the cams $f$ draw back the sleeve $d$ and the keys $d'$, against the pressure of the spring $e$, and withdraw the keys $d'$ from the slots $c^3$ of the flange $c^2$ and thereby disconnect the wheel $a$ from the axle $b$, so that it is then impossible to move the automobile under its own power.

It will be understood that while the hub and locking devices as shown in the drawings have been designed with reference to convenient application to standard forms of wheels and axles, various changes can be made in details of construction and arrangement to suit different conditions of use, and that the invention, except as pointed out in the claims, is not limited to the particular construction and arrangement shown and described herein.

I claim as my invention:

1. The combination of a driving axle, a wheel hub mounted thereon and adapted to rotate therewith, a clutch member fixed to the axle within the hub, a second clutch member within the hub and in engagement therewith and movable into and out of engagement with the fixed clutch member, a lock mounted in the hub, and means actuated by the operation of the lock to move the movable clutch member.

2. The combination of a driving axle, a wheel hub mounted thereon and adapted to rotate therewith, a clutch member fixed to the axle within the hub, a second clutch member within the hub and in engagement therewith and movable into and out of engagement with the fixed clutch member, a cam ring in operative engagement with the movable clutch member, and a lock mounted in the hub and in operative engagement with the cam ring.

3. The combination of a driving axle, a wheel hub mounted thereon and adapted to rotate therewith, a clutch member fixed to the axle within the hub, a sleeve interposed between the axle and the hub, keyed to the hub and having a key to engage the fixed clutch member, a lock mounted in the hub, and means actuated by the operation of the lock to move said sleeve.

4. The combination of a driving axle, a wheel hub mounted thereon and adapted to rotate therewith, a clutch member fixed to the axle within the hub, a sleeve interposed between the axle and the hub, keyed to the hub and having a key to engage the fixed clutch member, a cam ring mounted in the hub in operative engagement with said sleeve, and a lock in operative relation with said sleeve to move the same.

5. The combination of a driving axle, a wheel hub mounted thereon and adapted to rotate therewith, a clutch member fixed to the axle within the hub, a second clutch member within the hub and in operative engagement therewith and movable into and out of engagement with the fixed clutch member, a spring to move the second clutch member in one direction, a cam ring in operative engagement with the second clutch member to hold the same in opposition to the spring, and a lock mounted in the hub in operative relation with the cam ring.

6. The combination of a driving axle, a wheel hub mounted thereon and adapted to rotate therewith, a clutch member fixed to the axle within the hub, a second clutch member within the hub and in engagement therewith and movable into and out of engagement with the fixed clutch member, a cam ring mounted in the hub in operative engagement with the second clutch member and having a key-hole slot, a fixed headed stud to engage the keyhole slot of the cam ring, and means to operate the cam ring to disengage the movable clutch member from the fixed clutch member and to engage the headed stud in the keyhole slot.

This specification signed this 11th day of May A. D. 1922.

DAVID R. SCHNAARS.